United States Patent Office 3,299,045
Patented Jan. 17, 1967

3,299,045
7-HYDRAZINO-3,4,5,6-TETRAHYDRO-2H-AZEPINES
Karl Gatzi, Basel, Switzerland, assignor, by mesne assignments, to H. A. Whitten & Co., New York, N.Y., a partnership
No Drawing. Original application June 25, 1963, Ser. No. 290,308. Divided and this application Nov. 24, 1965, Ser. No. 528,000
Claims priority, application Switzerland, July 10, 1962, 8,320/62
2 Claims. (Cl. 260—239)

This application is a division of copending application Serial No. 290,308, filed June 25, 1963. This invention relates to novel heterocyclic amines which possess valuable fungicidal properties.

It has been found that heterocyclic amines of the general Formula I

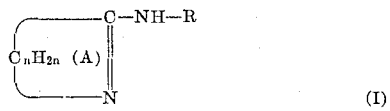

wherein R represents alkylamino with from 1 to 15 carbon atoms, and $n$ represents a whole number from 3 to 15,
from 3 to not more than 7 of the carbon atoms of $C_nH_{2n}$ being ring members of ring A,
their salts, with inorganic and organic acid as well as their quaternary salts, have excellent fungicidal properties.

Compounds of the general Formula I are obtained by reacting equivalent amounts of a lactim ether of the formula

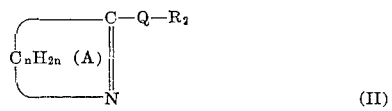

wherein $R_2$ represents a lower alkyl radical having 1 to 3 carbon atoms,
Q represents oxygen or sulfur, and
$n$ has the above given meaning, preferably in the presence of an organic solvent and of a tertiary amine as catalyst, with a primary amine of the general formula $$NH_2—R \qquad (III)$$

wherein R has the meaning given above. As organic solvents, e.g., aromatic hydrocarbons, alcohols, esters, ketones, ethers, etc., are used.

Examples of tertiary amines are pyridine, trimethylamine, triethylamine, triethanolamine, etc. In the reaction, the radical —$QR_2$ is split off and an alcohol or mercaptan is formed. By the term "salts" are meant salts of inorganic and organic acids as well as the quaternary salts. The salts of inorganic and organic acids with compounds of the general Formula I are obtained by reacting optionally in the presence of neutral organic solvents or of water, the reaction products obtained by the process described, with equivalent amounts of an inorganic or organic acid such as hydrochloric acid, sulfuric acid, phosphoric acid, formic acid, acetic acid, propionic acid, sorbic acid, oxalic acid, succinic acid, phthalic acid, p-toluene sulfonic acid, and others.

The quaternary salts are obtained by reacting equivalent amounts of compounds of the general Formula I with conventional quaternising agents, e.g., reactive esters of sulfuric acid and toluene sulfonic acid, or reactive derivatives of alcohols, e.g., methyl iodide, butyl bromide or benzyl chloride. This reaction may be performed in the presence of an organic inert solvent, e.g., benzene, or of water.

By the symbol —$C_nH_{2n}$— in the Formulas I and II are meant alkylene radicals with from 3 to 15 carbon atoms which may be substituted by branched or straight chain alkyl radicals, but of which from 3 to not more than 7 carbon atoms are ring members of ring A.

The compounds of Formula I or their salts are suitable in particular as active substances for fungicidal agents. Due to their slight toxicity to warm blooded animals and the absence of phytotoxicity in the concentrations applied in practice, which vary between 0.1 to 2% calculated on the active substance, the compounds of Formula I are particularly suitable for plant protection. The use of the active substances as fungicides in orchards is of particular importance. In addition the active substances according to the invention can be used as dry seed dressing agents as they have an excellent action, e.g., on *Tilletia tritici, Fusarium culmorum*, etc., and they do not inhibit germination.

The following examples describe the production of the active substances according to the invention. Parts are given therein as parts by weight unless stated otherwise and the temperatures are in degrees centigrade.

EXAMPLE 1

12.7 parts of O-methyl caprolactim [1], 18.5 parts of n-dodecylamine, 200 parts by volume of ethanol and 1.0 part of triethylamine are refluxed for 20 hours. The main amount of the ethanol is then evaporated off in vacuo and the residue is taken up in ether and washed with water. On evaporating the ether solution, the 7-dodecylamino-3,4,5,6-tetrahydro-2H-azepine obtained is recrystallized from petroleum ether.

On dissolving in the equivalent amount of dilute hydrochloric acid, the hydrochloride is obtained (re-crystalized from water or acetone).

In an analogous manner, there are produced from 7-dodecylamino-3,4,5,6-tetrahydro-2H-azepine and the corresponding dilute acid the sulfate, nitrate, phosphate, formiate, acetate, propionate, sorbate, oxalate, succinate, fumarate, phthalate, p-toluenesulfonate and benzoate of 7-dodecylamino-3,4,5,6-tetrahydro-2H-azepine.

Further compounds of Formula I of which the data for $n$, $z$, which represents the number of carbon atoms being ring members in ring A, as well as R, are given in Table I below. 1 and 2 from equivalent amounts of the corresponding lactim ether of Formula II and the corresponding amine of Formula III.

The starting materials are either known or have been produced in a manner analogous to that of making the known starting materials.

Table I

| Example No. | n | z | Alkyl branching | R | Salt |
|---|---|---|---|---|---|
| 2 | 5 | 5 | | n-Hexylamino | |
| 3 | 5 | 5 | | n-Butylamino | |
| 4 | 5 | 5 | | n-Octylamino | |
| 5 | 5 | 5 | | n-Decylamino | |
| 6 | 5 | 5 | | n-Dodecylamino | |

The compounds of structure I are suitable as active substances in fungicidal agents for the most various forms of application such as inhibition and repression of the growth of fungi on plants and parts thereof as well as the protection of organic materials of all types such as wood, textiles, furs, leather, paper, synthetic substances, etc., from attack and decomposition by fungi. For these purposes the active substances are employed in a finely distributed form as such or combined with

[1] O-methyl caprolactim produced as described in Organic Synthesis 31, 72 (1951).

suitable carriers and distributing agents. They can also be used in combination with other fungicidally active substances as well as with fungistatica and bacteriostatica. To increase the range of action, also insecticidally or nematocidally active substances, etc., can be added to the active substances used according to the invention.

To produce fungicidal agents according to the invention the active substances can be mixed, for example, with solid, pulverulent carriers such as, e.g., talcum, kaolin, loess, chalk or ground limestone. If desired, the pulverulent agents obtained can be made suspendable in water by the addition of suitable wetting and dispersing agents such as sulphite waste liquor. In addition, the active substances as such in solid, finely ground form, can be suspended in water with the aid of capillary active substances, or they can be emulsified in water, after dissolving them in organic solvents, with the aid of suitable emulsifying agents. Also, the active substances can be dissolved in organic solvents, e.g., in chlorinated hydrocarbons such as trichloroethylene, or in medium petroleum fractions, boiling range 100° to 200° possibly with the addition of auxiliary solvents such as acetone or higher ketones, e.g., cyclohexanone. Finally, the active substances can also be employed in the form of aerosols, smoke or mist, particularly in storerooms and greenhouses.

The fungicidal active substances are applied to an organic material to be protected generally either by admixture therewith, by spraying or by impregnating with organic-aqueous or aqueous solutions of the active substance which can contain the active substance in dispersion or suspension.

The following examples further illustrate the production of some fungicidal agents:

EXAMPLE 1

10 parts 7-octylhydrazino-3,4,5,6-tetrahydro-2H-azepine, produced as described in Example 4 are dissolved in 80 parts of dimethyl formamide and 10 parts of an alkyl-aryl sulphonate are mixed into this solution until homogeneity is attained. In this way an emulsifiable solution is obtained which can be diluted to any concentration desired.

The fungicidal activity of the compounds of general Formula I was determined by the germination test with spores of the following types of fungi: *Alternaria tenuis, Botrytis cinerea, Clasterosporium c., coniothyrium dipl., Fusarium culm, Mucor spec., Penicillium spec.,* and *Stemphyllium cons.*

I claim:

1. A member selected from the group consisting of
   (a) a compound of the formula

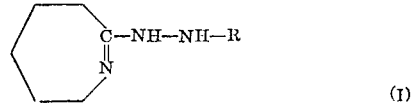

(I)

and
   (b) a fungicidally effective salt of the compound of Formula I and an acid, R in Formula I being alkyl with from 1 to 15 carbon atoms.

2. A compound of the formula

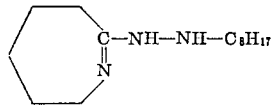

No references cited.

ALEX MAZEL, *Primary Examiner.*

A. D. ROLLINS, *Assistant Examiner.*